United States Patent [19]
Choi et al.

[11] Patent Number: 5,815,535
[45] Date of Patent: Sep. 29, 1998

[54] CARRIER RECOVERY APPARATUS

[75] Inventors: Yang-seok Choi, Seoul; Jang-jin Choi, Suwon, both of Rep. of Korea

[73] Assignee: Samsung Electronics Co., Ltd., Kyungki-Do, Rep. of Korea

[21] Appl. No.: 831,649

[22] Filed: Apr. 9, 1997

[30] Foreign Application Priority Data

Apr. 10, 1996 [KR] Rep. of Korea ............. 96-10860

[51] Int. Cl.$^6$ .................................. H04L 27/06
[52] U.S. Cl. .................. 375/344; 375/375; 375/343; 329/307
[58] Field of Search .................. 375/344, 343, 375/375; 329/307, 308

[56] References Cited

U.S. PATENT DOCUMENTS

| | | | |
|---|---|---|---|
| 3,878,334 | 4/1975 | Halpern | 375/375 |
| 4,672,637 | 6/1987 | Halpern et al. | 375/343 |
| 4,860,321 | 8/1989 | Von Der Embse | 375/343 |
| 4,916,405 | 4/1990 | Keate et al. | 329/308 |

*Primary Examiner*—Stephen Chin
*Assistant Examiner*—Frederick Yu
*Attorney, Agent, or Firm*—Sughrue, Mion, Zinn, Macpeak & Seas, PLLC

[57] ABSTRACT

A carrier recovery apparatus includes a loop filter that converges quickly and corrects a large frequency error. The carrier recovery apparatus includes a multiplier, a matched filter, a phase error detector, a loop filter and a numerically controlled oscillator (NCO). A bandwidth varying circuit varies the bandwidth of the loop filter according to whether the signal output from the matched filter is phase-locked. A frequency error detector detects a frequency error from the output of the matched filter. An adder adds each level of an input sweep signal and the output of the loop filter, and supplies the added results to the NCO. A switch selectively supplies the output of the loop filter to the adder. A controller generates a sweep signal having a plurality of levels and controls turning the switch on and off. The controller supplies the sweep signal having the plurality of levels to the adder during the time when the switch is turned off, to determine the level of the sweep signal when the output of the frequency error detector becomes zero, and supplies the level of the determined sweep signal to the adder during the time when the switch is turned on. The carrier recovery apparatus can recover an optimal carrier from the received signal.

12 Claims, 3 Drawing Sheets

CARRIER RECOVERY APPARATUS

BACKGROUND OF THE INVENTION

The present invention relates to a carrier recovery apparatus for a digital communication system. More particularly, the present invention is directed to an apparatus for extending the range of which a frequency error can be corrected and varying the bandwidth of a loop filter.

A general receiver in a digital communication system recovers a local carrier having the same phase and frequency as those of a carrier suppressed in a received signal, in order to demodulate a quadrature amplitude modulation (QAM) or quadrature phase shift keying (QPSK) modulation signal. A well-known local carrier recovery technique uses a voltage controlled oscillator in a phase locked loop to generate a frequency signal corresponding to a local carrier. Such a general carrier recovery apparatus is shown in FIG. 1.

In FIG. 1, a multiplier 1 receives a signal which is demodulated into baseband and then converted into a digital signal. The multiplier 1 multiplies the received signal by a frequency signal output from a numerically controlled oscillator (NCO) 5 and outputs the multiplied result to a matched filter 2. The matched filter 2 matches and filters the input signal and outputs the filtered signal to a phase error detector 3 as well as to an external unit (not shown). The phase error detector 3 detects a phase error from the input signal and outputs the detected result to a loop filter 4. The loop filter 4 removes noise from the detected phase error and outputs the result to the NCO 5. The NCO 5 oscillates at a frequency proportional to the output of the loop filter 4 and supplies the oscillating frequency signal to the multiplier 1. Therefore, the output of the multiplier 1 becomes a phase error corrected signal. When the loop filter 4 is a primary low-pass filter, even the frequency error can be corrected.

However, since a general phase error detector 3 is not perfect in error detection capability, it is difficult to adjust a coefficient of the loop filter 4. Although a large frequency error can be corrected and the convergence speed will be fast when the bandwidth of the loop filter 4 widens, much noise is created. On the other hand, although the convergence speed is slow and a correctable frequency error is small when the bandwidth of the loop filter 4 narrows, much noise does not flow in.

SUMMARY OF THE INVENTION

To solve the above problem, it is an object of the present invention to provide a carrier recovery apparatus for varying the bandwidth of a loop filter having the quick convergence and noise-protection capabilities.

It is another object of the present invention to provide a carrier recovery apparatus for extending the range of a correctable frequency error by sweeping the frequency of a numerically controlled oscillator.

To accomplish the above and other objects of the present invention, there is provided a carrier recovery apparatus for recovering a carrier with respect to an input signal, having a multiplier, a matched filter, a phase error detector, a loop filter and a numerically controlled oscillator (NCO). The carrier recovery apparatus includes bandwidth varying means for varying the bandwidth of the loop filter according to whether the signal output from the matched filter is phase-locked; a frequency error detector for detecting a frequency error from the output of the matched filter; an adder for adding each level of an input sweep signal and the output of the loop filter; a switch for selectively supplying the output of the loop filter to the adder; and a controller for generating a sweep signal having a plurality of levels and turning the switch on or off. The controller supplies the sweep signal having the plurality of levels to the adder during the time when the switch is turned off, to determine the level of the sweep signal when the output of the frequency error detector becomes zero, and supplies the level of the determined sweep signal to the adder during the time when the switch is turned on.

In further accordance with the above and other objects, the present invention provides a method of recovering a carrier from an input signal. The method includes the steps of multiplying the input signal by a frequency signal to produce a multiplied input signal, matching and filtering the multiplied input signal, to produce a filtered signal, detecting a phase error in the filtered signal, to produce a phase error signal, selecting one of a plurality of bandwidths based on whether the filtered signal is phase locked, removing noise from the phase error signal based on the selected bandwidth, to produce a first frequency control signal, detecting a frequency error in the filtered signal, to produce a second frequency control signal, selectively adding an input sweep signal based on the second frequency error signal to the first frequency control signal, to produce a third frequency control signal, and producing the frequency signal based on the third frequency control signal.

BRIEF DESCRIPTION OF THE DRAWINGS

The preferred embodiments are described with reference to the drawings wherein.

DETAILED DESCRIPTION OF PREFERRED EMBODIMENTS

A preferred embodiment of the present invention will be described in detail with reference to the accompanying drawings.

Figure 1:
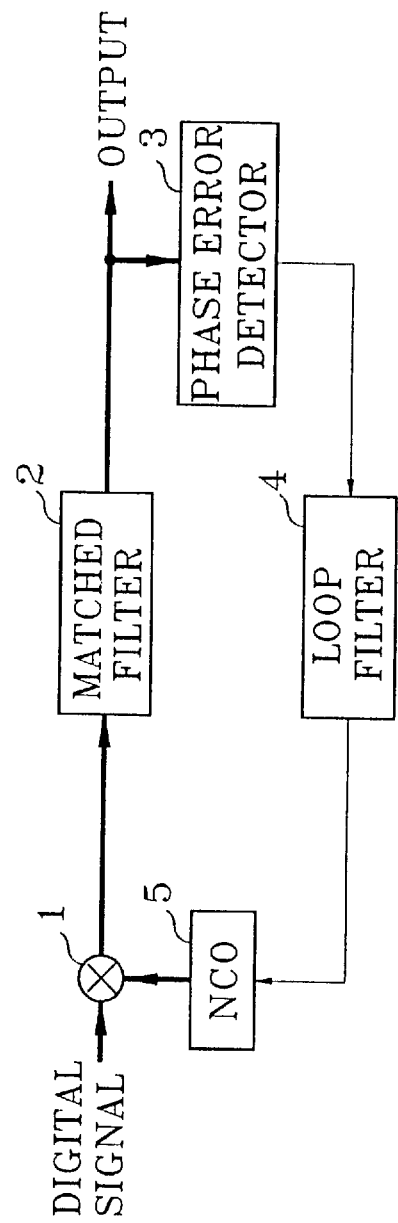
FIG. 1 is a block diagram of a general carrier recovery apparatus.
Figure 2:
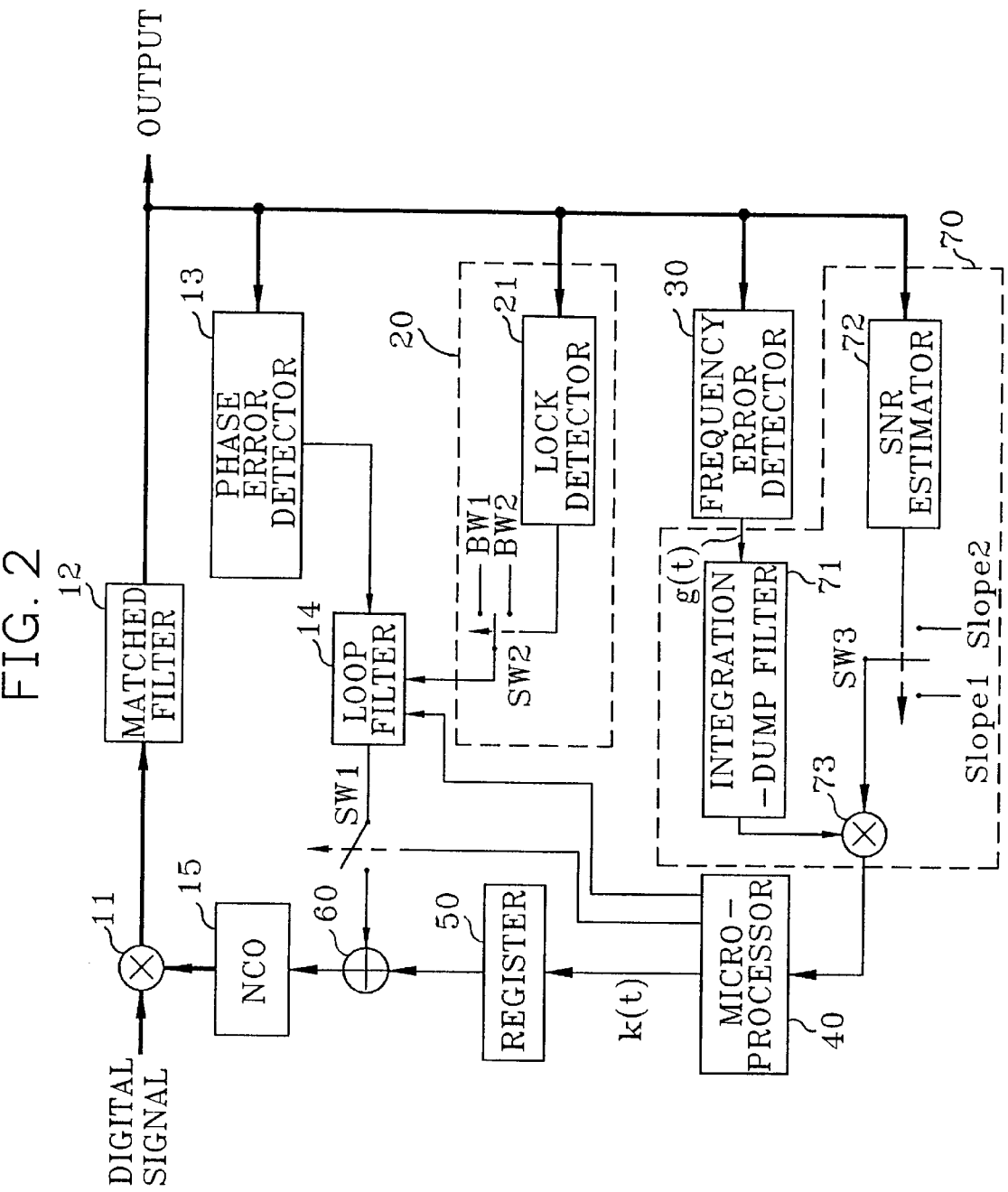
FIG. 2 is a block diagram of a carrier recovery apparatus according to a preferred embodiment of the present invention.

In FIG. 2, a carrier recovery apparatus according to a preferred embodiment of the present invention, includes a multiplier 11, a matched filter 12, a phase error detector 13, a loop filter 14 and a numerically controlled oscillator (NCO) 15. The carrier recovery apparatus also includes a bandwidth varying circuit 20 for varying the bandwidth of the loop filter 14. A lock detector 21 in the bandwidth varying circuit 20 detects phase lock from the output of the matched filter 12. The output of the lock detector 21 is supplied to a switch SW2 and is used in establishing one of predetermined bandwidths BW1 and BW2 as the bandwidth of the loop filter 14. A frequency error detector 30 detects a frequency error from the output of the matched filter 12. A feature corrector 70 receives the outputs of the frequency error detector 30 and the matched filter 12, corrects the output feature of the frequency error detector 30, and then outputs the corrected result. An integration-dump filter 71 in the feature corrector 70 averages the output of the frequency error detector 30 for a predetermined period of time and then outputs the averaged result. A signal to noise ratio (SNR)

estimator 72 in the feature corrector 70 estimates the SNR of the received signal from the output of the matched filter 12 and generates the estimated result. The estimated result of the SNR estimator 72 is supplied to a switch SW3 and is used in selecting one of predetermined slope values Slope1 and Slope2. A multiplier 73 in the feature corrector 70 multiplies the slope value output via the switch SW3 by the output of the integration-dump filter 71 and outputs the multiplied result to a microprocessor 40.

Figure 4A:
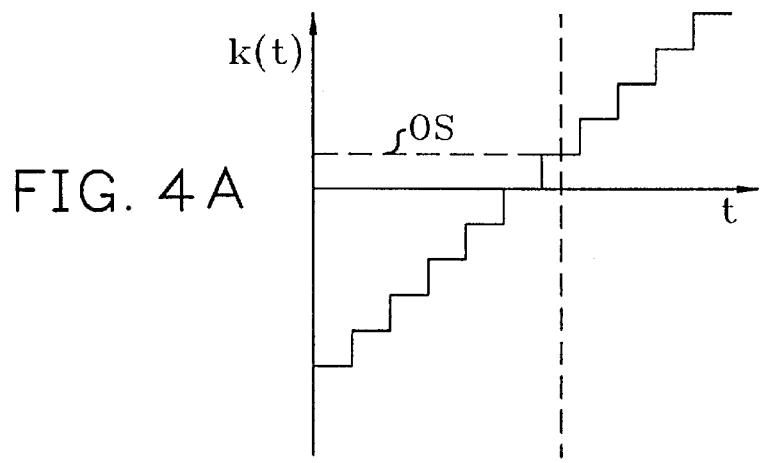
FIGS. 4A and 4B are graphical views for explaining a sweep operation in the microprocessor in FIG. 2.

The microprocessor 40 generates a sweep signal in the form of a step function as shown in FIG. 4A. The microprocessor 40 receives the output value of the feature corrector 70 corresponding to an individual value of the sweep signal, and outputs the value of the sweep signal corresponding to the particular value received. A register 50 stores the output of the microprocessor 40. An adder 60 adds the outputs of the loop filter 14 and the register 50, and supplies the added result to the NCO 15.

When the apparatus illustrated in FIG. 2 is initialized by a reset signal, the microprocessor 40 turns a switch SW1 off. If the switch SW1 is turned off, the microprocessor 40 performs a sweep operation in order to obtain the frequency of the NCO 15 congruent with the frequency of the modulated carrier. The microprocessor 40 generates the sweep signal k(t) whose magnitude gradually increases with respect to time, as illustrated in FIG. 4A. The sweep signal is input to the NCO 15 via the register 50 and the adder 60. The NCO 15 oscillates at a frequency which is proportional to the input signal, and outputs an oscillating frequency signal to the multiplier 11. The multiplier 11 multiplies a digital signal of the received baseband by the frequency signal output from the NCO 15, and outputs the multiplied result. The output signal of the multiplier 11 is output via the matched filter 12. The frequency error detector 30 detects the frequency error from the output signal of the matched filter 12.

Figure 4B:
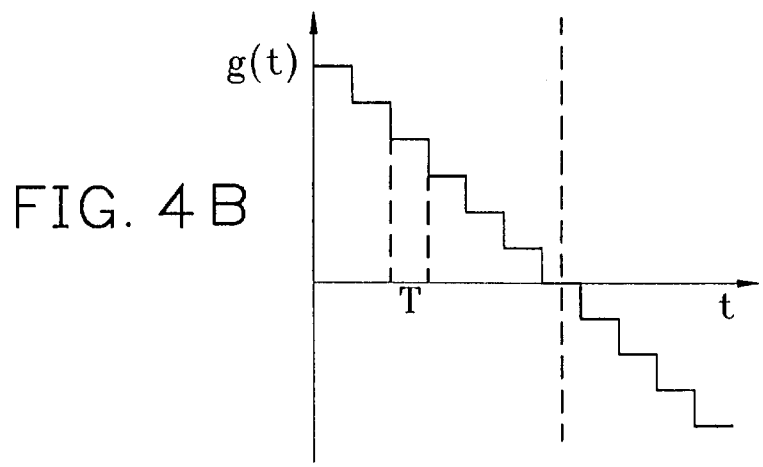

FIG. 4B shows the value g(t) of the frequency error signal detected by the frequency error detector 30 with respect to the sweep signal of FIG. 4A. The microprocessor 40 receives the frequency error signal and outputs the sweep signal corresponding to the frequency error signal whose error value g(t) is zero. Therefore, the microprocessor 40 outputs the sweep signal whose value is indicated as "OS" in FIG. 4A.

If the frequency error detector 30 is ideal, a frequency error can be completely removed by setting a frequency value to a value that results in completely removing any frequency error to produce a frequency error value of zero. However, since the detection capability of the frequency error detector 30 is not generally perfect, the present invention uses a feature corrector 70 which corrects the output feature of the frequency error detector 30 to complement such imperfection.

The operation of correcting the output feature of the frequency error detector 30 in the feature corrector 70 follows.

The frequency error detected at an arbitrary time in the frequency error detector 30 has a very inaccurate value due to noise. Therefore, the integration-dump filter 71 receives the frequency error value and averages it for a predetermined time T.

Figure 3:
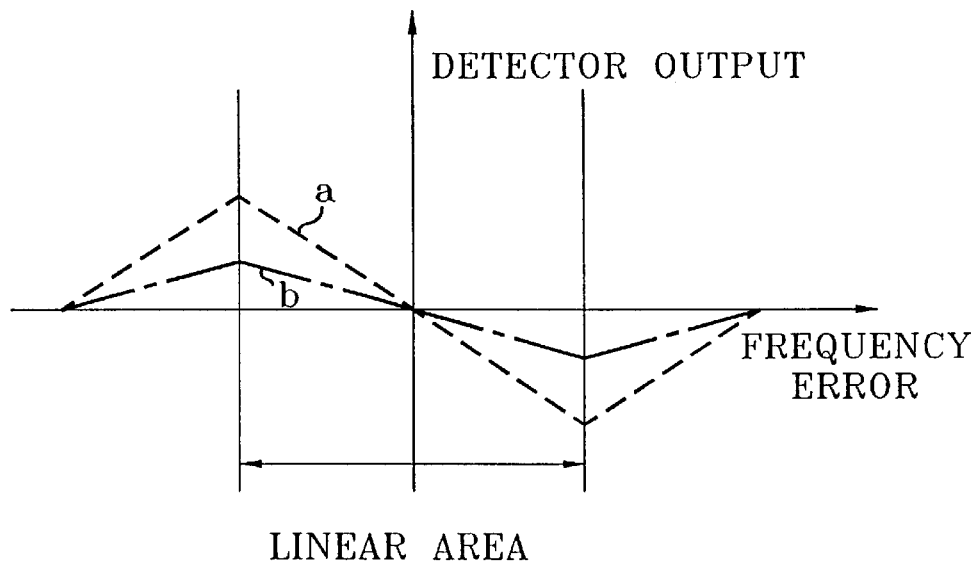
FIG. 3 is a graphical view showing output features of the frequency error detector in FIG. 2.

Meanwhile, the output feature of the frequency error detector 30 varies according to a signal-to-noise ratio (SNR) of the received signal. When the SNR is large, the output value of the frequency error detector 30 with respect to the frequency error varies greatly. Thus, such a variation is shown as waveform "a" in FIG. 3. Meanwhile, when the SNR is small, the output value of the frequency error detector 30 with respect to the frequency error varies little as shown by waveform "b" in FIG. 3. The SNR estimator 72 estimates the SNR from the input signal and generates a value representing whether the estimated SNR result is larger or smaller than a predetermined value. The predetermined slope values Slope1 and Slope2 are the same as those of the waveforms "a" and "b" shown in FIG. 3, respectively. The switch SW3 selects one of the predetermined slope values Slope1 and Slope2 according to the estimated result supplied from the SNR estimator 72. That is, the waveform "a" of FIG. 3 corresponds to the Slope1 and the waveform "b" thereof corresponds to the Slope2. When the estimated result represents a large SNR, the switch SW3 selects a first slope value Slope1 having a gentle slope. When the estimated result represents a small SNR, the switch SW3 selects a second slope value Slope2 having a steep slope. The multiplier 73 multiplies the slope value output via the switch SW3 by the output of the integration-dump filter 71. Therefore, the output of the multiplier 73 becomes a signal in which an output feature of the frequency error detector 30 is corrected according to the SNR.

The microprocessor 40 receives a signal from the feature corrector 70 by which the output feature of the frequency error detector 30 is corrected, and performs the above-described sweep operation with respect to the received signal. As a result, if a sweep signal corresponding to the frequency error value of zero is obtained, the microprocessor 40 turns the switch SW1 on.

When the switch SW1 is turned on, a feedback loop operation for recovering a carrier is performed in the FIG. 2 apparatus. The lock detector 21 in the bandwidth varying circuit detects phase lock from the input signal and generates the detected result value representing whether or not a lock is detected. It is preferable that the bandwidth of the loop filter 14 be wider for quick convergence at the initial time of the feedback loop operation. Thus, the lock detector 21 controls the switch SW2 to select the first bandwidth BW1 having a wide bandwidth among the predetermined bandwidths before detection of the phase lock. If a tuning width of the loop filter 14 is converged by a repeat feedback loop operation, the lock detector 21 detects the phase lock. If the detected result value represents that the lock is detected, the switch SW2 selects the second bandwidth BW2. If the bandwidth narrows by the selection of the second bandwidth BW2, the loop filter 14 minimizes the effect of noise and starts a fine tuning operation. The microprocessor 40 pre-stores filter coefficients corresponding to the predetermined bandwidths, and supplies the filter coefficient corresponding to the selected bandwidth to the loop filter 14.

The adder 60 adds the output of the loop filter 14 to the output of the register 50 and outputs the added result to the NCO 15. Thus, the value input to the NCO 15 becomes an optimal input value in which a frequency error and a phase error can be corrected as described above.

As described above, the carrier recovery apparatus according to the present invention can recover an optimal carrier by a quicker convergence speed and a larger correctable frequency error.

While only certain embodiments of the invention have been specifically described herein, it will apparent that numerous modifications may be made thereto without departing from the spirit and scope of the invention.

What is claimed is:

1. A carrier recovery apparatus for recovering a carrier from an input signal, comprising:
   a multiplier, coupled to receive said input signal, and operative to multiply said input signal by a frequency signal to produce a multiplied input signal;
   a matched filter, coupled to an output of said multiplier to receive said multiplied input signal, and operative to match and filter said multiplied input signal, to produce a filtered signal;
   a phase error detector, coupled to an output of said matched filter to receive said filtered signal, and operative to detect a phase error in said filtered signal, to produce a phase error signal;
   a loop filter, coupled to an output of said phase error detector to receive said phase error signal, and operative to remove noise from said phase error signal;
   bandwidth varying circuit, coupled to an output of said matched filter to receive said filtered signal, and varying the bandwidth of said loop filter according to whether said filtered signal is phase-locked;
   a frequency error detector, coupled to an output of said matched filter to receive said filtered signal, and detecting a frequency error in said filtered signal;
   an adder, coupled to an output of said frequency error detector and selectively coupled to an output of said loop filter, said adder adding an input sweep signal based on an output of said frequency error detector to an output of said loop filter, to produce a frequency control signal; and
   a numerically controlled oscillator (NCO), coupled to an output of said adder for receiving said frequency control signal, and producing said frequency signal.

2. The carrier recovery apparatus according to claim 1, further comprising:
   a switch for selectively coupling said loop filter to said adder, in order to selectively supply an output of said loop filter to said adder; and
   a controller for generating said input sweep signal having a plurality of levels and turning said switch on and off, wherein said controller supplies said sweep signal to said adder when said switch is turned off, to determine the level of the sweep signal when the output of said frequency error detector becomes zero, and supplies the level of the determined sweep signal to said adder when said switch is turned on.

3. The carrier recovery apparatus according to claim 1, wherein said bandwidth varying circuit comprises a phase lock detector for detecting whether a phase of said filtered signal is locked; and a switch for selecting one of at least two predetermined bandwidths in said loop filter according to whether the phase of said filtered signal is locked, wherein said switch selects a wider bandwidth among said predetermined bandwidths when said phase lock detector detects that the phase is not locked, and selects a narrower bandwidth after the phase is locked.

4. The carrier recovery apparatus according to claim 1, further comprising a correction circuit, coupled to said matched filter to receive said filtered signal and to an output of said frequency error detector, and being operative to correct an output feature of said frequency error detector.

5. The carrier recovery apparatus according to claim 4, wherein said correction circuit comprises: a signal-to-noise ratio (SNR) estimator, responsive to said filtered signal, and estimating a SNR of said filtered signal, to produce an estimated value; a switch for selecting one of predetermined slope values in response to said estimated value; and a multiplier for multiplying the value selected by said switch to the output of said frequency error detector.

6. The carrier recovery apparatus according to claim 5, wherein said correction circuit further comprises an integration-dump filter, responsive to an output of said frequency error detector, and averaging the output from said frequency error detector over a predetermined period of time, to produce an average error value, and supplying the averaged error value to said multiplier for multiplying the averaged error value to the value selected by said switch.

7. The carrier recovery apparatus according to claim 2, wherein said controller comprises a microprocessor and a register, said register being operative to store outputs of said microprocessor, and to output the stored outputs of said microprocessor to said adder.

8. The carrier recovery apparatus according to claim 2, wherein said sweep signal is a step function.

9. A method of recovering a carrier from an input signal, comprising the steps of:
   multiplying said input signal by a frequency signal to produce a multiplied input signal;
   matching and filtering said multiplied input signal, to produce a filtered signal;
   detecting a phase error in said filtered signal, to produce a phase error signal;
   selecting one of a plurality of bandwidths based on whether said filtered signal is phase locked;
   removing noise from said phase error signal based on the selected bandwidth, to produce a first frequency control signal;
   detecting a frequency error in said filtered signal, to produce a second frequency control signal;
   selectively adding an input sweep signal based on said second frequency error signal to said first frequency control signal, to produce a third frequency control signal; and
   producing said frequency signal based on said third frequency control signal.

10. The carrier recovery method as defined by claim 9, further comprising the steps of: generating said input sweep signal having a plurality of levels, wherein said sweep signal is not added to said first frequency control signal, during a first period of time in order to determine the level of the input sweep signal, and during a second period of time said determined level of the input sweep signal is added to said first frequency control signal.

11. The carrier recovery method according to claim 9, further comprising the steps of: detecting whether a phase of said filtered signal is locked; and selecting one of at least two predetermined bandwidths according to whether the phase of said filtered signal is locked, wherein a wider bandwidth among said predetermined plurality of bandwidths is selected when the phase of said filtered signal is not locked, and a narrower bandwidth is selected when the phase of said filtered signal is locked.

12. The carrier recovery method according to claim 9, further comprising the steps of: correcting said second frequency control signal by averaging said second frequency control signal over a predetermined period of time, to produce an average error value, estimating a signal-to-noise ratio (SNR) of said filtered signal, to produce an estimated value; selecting one of predetermined slope values in response to said estimated value; and multiplying the value selected by said switch to said average error value.

* * * * *